Aug. 27, 1946.  L. F. BEACH ET AL  2,406,342
LOCKING MECHANISM FOR DIRECTIONAL GYROSCOPES
Filed Jan. 7, 1944  2 Sheets-Sheet 1

INVENTORS;
LENNOX F. BEACH,
ORLAND E. ESVAL, and
ARTHUR W. LANE;
BY
Herbert H. Thompson
THEIR ATTORNEY.

Aug. 27, 1946.   L. F. BEACH ET AL   2,406,342
LOCKING MECHANISM FOR DIRECTIONAL GYROSCOPES
Filed Jan. 7, 1944   2 Sheets-Sheet 2
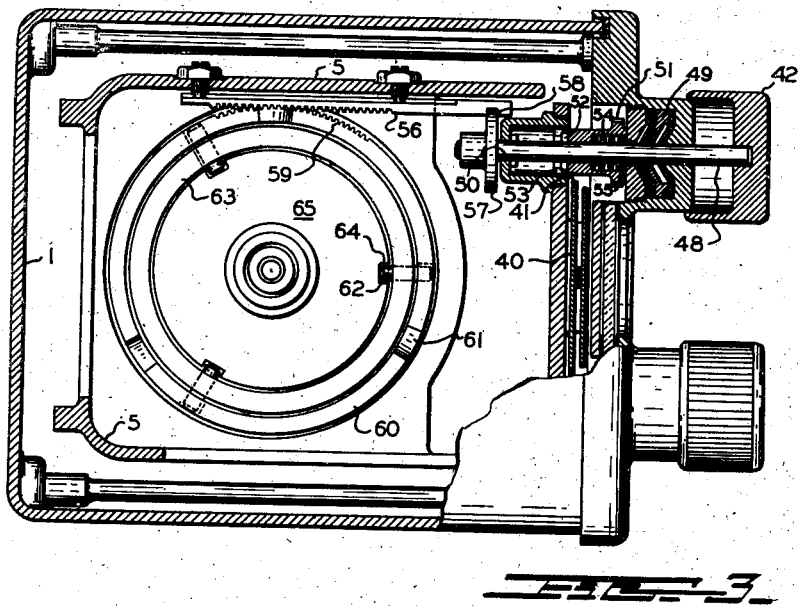
INVENTORS,
LENNOX F. BEACH,
ORLAND E. ESVAL, and
ARTHUR W. LANE;
BY
THEIR ATTORNEY Patented Aug. 27, 1946

2,406,342

UNITED STATES PATENT OFFICE 2,406,342

LOCKING MECHANISM FOR DIRECTIONAL GYROSCOPES

Lennox F. Beach, Port Washington, Orland E. Esval, Huntington, and Arthur W. Lane, Roosevelt, N. Y., assignors to Sperry Gyroscope Company, Inc., a corporation of New York Continuation of application Serial No. 459,804, September 26, 1942, which is a division of application Serial No. 431,704, February 20, 1942. This application January 7, 1944, Serial No. 517,320

10 Claims. (Cl. 74—5)

1

This invention generally relates to an improvement in locking mechanisms for gyro instruments and is particularly directed to the novel subject matter in this connection divided from our copending application Serial No. 431,704, filed February 20, 1942, for Directional gyroscopes.

The present application is a continuation of divisional application Serial No. 459,804, filed September 26, 1942, for Locking mechanisms for directional gyroscopes.

Figure 1:
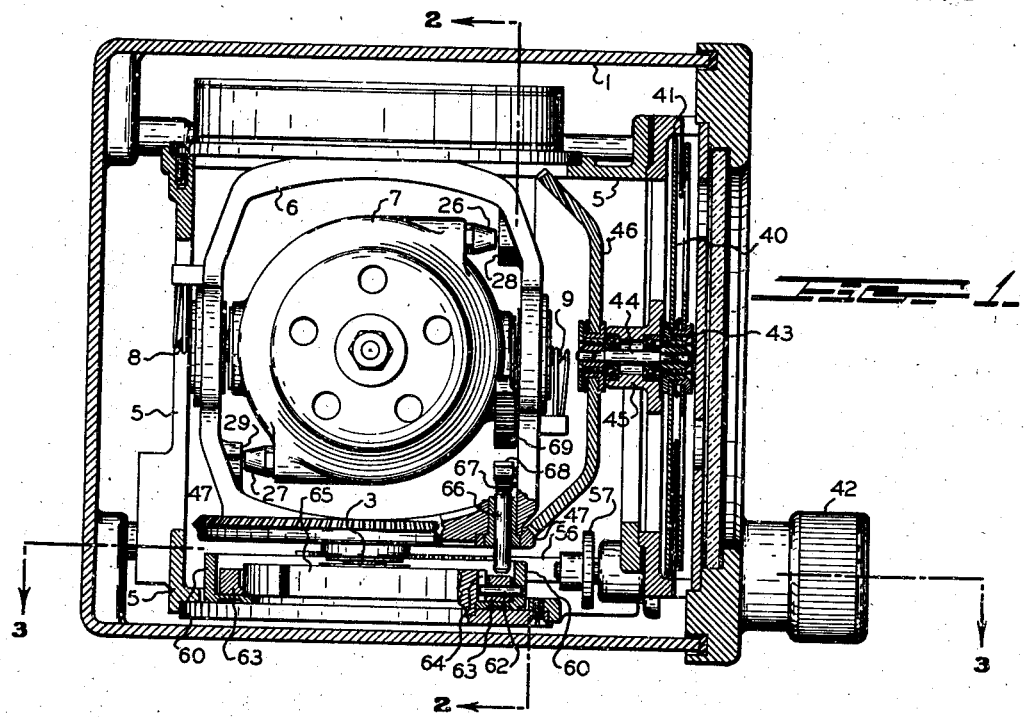

The novel features and details of the invention will be apparent from the following description when read in relation with the accompanying drawings, wherein Fig. 1 is a vertical section of a directional gyro instrument in which the present improvements are incorporated.

Figure 2:
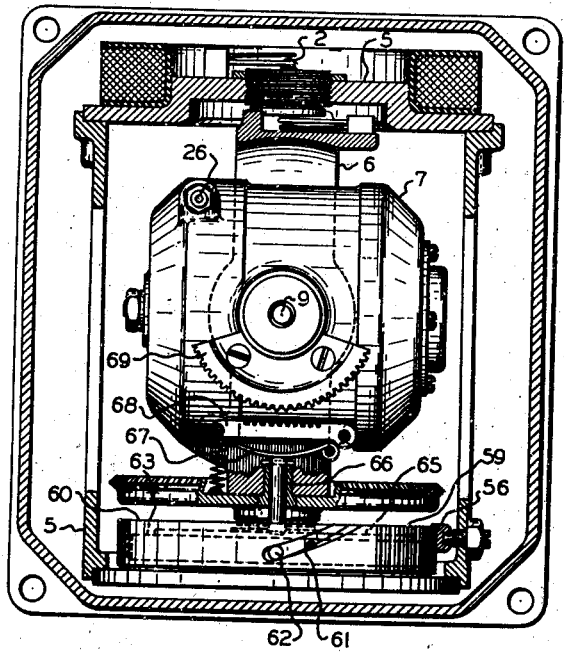

Fig. 2 is an elevation view, partly in section, taken at right angles to Fig. 1, and Fig. 3 is a horizontal section taken on line 3—3, in Fig. 1.

The instrument in which this invention is illustratively embodied as shown in the drawings is an electrically spun directional gyroscope of the type which may or may not be slaved to or controlled from a remote magnetic compass. However, our improved locking device is applicable to other types of gyroscopes. The illustrated gyro instrument includes an outer casing 1 having a shock mounting frame 5 in which a conventional vertical ring or other gimbal 6 is mounted for movement about a vertical axis by means of the respective upper and lower trunnions 2 and 3 which are journaled in suitable bearings (not shown) in the frame. Ring 6 also supports the rotor bearing case or frame 7 of the gyro instrument with freedom of movement about a horizontal axis, this mounting being provided by trunnions 8 and 9 extending from the case and suitable bearings (not shown) in the opposite legs of the ring. The gyro rotor (not shown) is suitably journaled within the rotor bearing case, the spin axis of the rotor being normally disposed at right angles to both the vertical axis of the ring 6 and the horizontal axis of the case 7. The gyro rotor is preferably spun by means of a suitable polyphase motor (not shown) which is energized from a suitable source of electrical energy by way of a number of current conducting substantially frictionless trunnion pivot structures as particularly described in the parent application.

The gyro case 7 is shown as pneumatically leveled, in the present instance, by means of air jets which issue from the tangentially directed

2 nozzles 26 and 27 mounted on the rotor bearing case, Fig. 1. The jets are directed against vertical knife edge baffles 28 and 29 on the vertical ring 6, the knife edges normally bisecting the jets from the nozzles when the rotor case is in a leveled position. In the event of inclination of the case from a leveled position, a torque is exerted by one of the jets about the vertical axis of the ring to restore the case to a normal leveled position.

With reference to Figs. 1 and 3, we prefer to employ in connection with this directional gyroscope a disc-shaped vertical compass card indicator 40. Said card is shown in the form of a flat disc having teeth 41 on its periphery so that it may be reset from a setting knob 42, as hereinafter described. Disc 40 is clamped on a hub 43 which in turn is secured to a shaft 44 journaled in the forward part of the interior of the casing 1 in a fixed hollow bushing 45. A crown gear 46 is mounted, through a slip friction connection, on the inner or opposite end of shaft 44. The crown gear is rotated by a complementary crown or bevel gear 47 secured to the base of the vertical ring 6, so that as relative angular azimuthal displacement of the outer casing 1 and gyroscope occurs, the card will rotate through the same angle.

In order to reset the compass card or indicating disc 40, it is preferred to lock the rotor bearing case 7 of the gyroscope about its axis defined by trunnions 8 and 9 at the time the card is reset. For this purpose, the setting knob 42, Fig. 3, is constructed so that it may be pushed inwardly with respect to casing 1 and also be rotated to reset the card. The knob 42 is shown as secured to a shaft 48 which is slidably and rotatably journaled in bearing 49, 50, in suitable mounting structure within the outer casing 1. A pinion 51 is mounted to rotate with the shaft 48 by means of an engaging cross pin 52 and slot 53 construction. A limited axial movement of the pinion 51 along the shaft 48 is permitted by this construction, but the pinion is yieldingly held against such movement by means of a coil spring 54 contained within an opening at one end of the same. One end of the coil spring 54 bears against the internal wall in the opening within the pinion, and the other end bears against a cross pin 55 which extends through the shaft 48. As the knob 42 is moved inwardly, the teeth on the pinion 51 are brought into engagement with the teeth 41 on the disc 40, but in the event that the teeth do not properly engage at first, the spring 54 permits the pinion 51 to yield until the teeth properly engage. With the parts thusly engaged, the card 40 may be readily reset in a desired position by the operator by turning the knob in the proper direction. Inwardly directed movement of the knob 42 also displaces a slidable rack bar 56 by means of the engagement of a collar 57 on the inner end of the shaft 48 and a groove 58 on the side of the rack bar. The teeth on the rack bar 56 mesh with a gear sector 59, Figs. 2 and 3, on a ring 60 which is rotatably mounted below the vertical ring supporting structure for the gyroscopic instrument. The ring 60 is shown as having a number of circumferentially spaced inclined slots 61 therein into each of which projects a radially extending pin 62 situated on a smaller ring 63 concentrically mounted within said ring 60. Rotating movement of the ring 63 is prevented by an extending portion of the respective fixed pins 62 therein in a like number of spaced vertical slots 64 contained in the periphery of a fixed base 65.

Ring 61 is mounted for limited rotation and the ring 63 is slidably but non-rotatably mounted to move relative to the ring 61. The ring 63 includes means therein in the form of pins 62 for engaging the inclined slots in the ring 61.

It will be seen therefore, that rotation of the outer ring 60 by rack 56 will lift the inner ring 63. As said ring 63 is lifted, Fig. 1, it engages the lower end of a vertically positioned pin 66 which is slidably mounted in the vertical ring 6. The upper end of pin 66 is indicated as engaging a curved leaf spring 67 secured to a pivoted rack 68. Normally, rack 68 is disengaged from a gear sector 69 suitably secured to the exterior of the bearing case 7, but when the pin 66 is lifted, the teeth of the rack 68 engage the gear sector 69 to thereby lock the gyroscope about the horizontal axis of the same defined by trunnions 8 and 9. The spring 67 serves to prevent damage to the teeth of the engaging rack and sector in the event that the same do not mesh properly when initial contact between the parts is made. The contact of pin 66 and ring 63 constitutes a slip friction lock for the vertical ring 6 of the gyroscopic instrument; that is, the friction between the pin 66 and ring 63 opposes turning of the vertical ring but does not rigidly lock the same, thereby lessening the strain on the parts during the caging operation.

It will be noted that according to the present invention, the gyroscopic instrument is locked about the horizontal axis but is not manually reset about its vertical axis, the card 40 only of the instrument being manually reset without effecting movement of the rotor bearing case because of the slip friction mounting of the gear 46, the friction between the stationary ring 63 and the vertical ring 6 through the pin 66 being much greater than the aforesaid friction of the mounting of the gear 46 on its hub at the time that the ring 63 is lifted during the resetting operation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A locking mechanism for directional gyroscopes comprising, in combination, a gyro rotor, a bearing frame therefor, a vertical ring on which the frame is mounted to pivot about a horizontal axis, means for locking the frame from pivotal movement comprising a sector gear fixedly mounted on said frame and a normally ineffectively positioned toothed piece movably mounted on said vertical ring, and means for moving said toothed piece to an effective locking position in which the piece engages the sector gear.

2. A locking mechanism as claimed in claim 1, which includes a yielding element interposed between the toothed piece and the means for moving the same.

3. A locking mechanism for directional gyroscopes comprising, in combination, a gyro rotor, a bearing frame therefor, a vertical ring on which the frame is mounted to pivot about a horizontal axis, a casing in which the ring is mounted to pivot about a vertical axis, means for locking the frame from pivotal movement comprising a sector gear fixedly mounted on said frame and a normally ineffectively positioned toothed piece movably mounted on said vertical ring, an axially movable pin for actuating said toothed piece to an effective engaging position with said sector gear, and means for simultaneously moving said pin axially and engaging the same to effectively lock the ring from pivotal movement.

4. A locking mechanism as claimed in claim 3 in which the toothed piece is a rack which is pivotally mounted on the vertical ring.

5. A locking mechanism as claimed in claim 3 which includes a yielding element interposed between the toothed piece and the axially movable pin.

6. A locking mechanism for directional gyroscopes comprising, in combination, a gyro rotor, a bearing frame therefor, a vertical ring on which the frame is mounted to pivot about a horizontal axis, a casing in which the ring is mounted to pivot about a vertical axis, means for locking the frame from pivotal movement comprising a sector gear fixedly mounted on said frame and a normally ineffectively positioned toothed piece movably mounted on said vertical ring, an axially movable pin for actuating said toothed piece to an effective engaging position with said sector gear, an axially movable annular member, coaxially positioned with respect to the ring, for simultaneously engaging said pin to effectively lock the ring from pivotal movement and move the pin axially, and means for actuating said annular member.

7. A locking mechanism for directional gyroscopes comprising, in combination, a gyro rotor, a bearing frame therefor, a vertical ring on which the frame is mounted to pivot about a horizontal axis, means for locking the frame from pivotal movement comprising a gear mounted coaxially with respect to the axis of the frame and a normally ineffective meshing piece therefor movably mounted on the vertical ring, and means for moving said meshing piece to an effective locking position with the gear.

8. Locking means for gyroscopes comprising the combination with an outer casing, a rotor bearing frame mounted for oscillation about an axis therein, a ring mounted for limited rotation in said casing and having inclined slots therein, a concentric ring slidably but non-rotatably mounted within said first ring and having means for engaging said inclined slots, a setting knob for rotating said outer ring and thereby lifting the inner ring with respect thereto, and locking means lifted by said inner ring for engaging said frame to lock the same against oscillation about said axis.

9. Locking means for gyroscopes comprising the combination with an outer casing, a rotor bearing frame, a gimbal ring journaled in said casing for turning about an axis and within which said frame is journaled for oscillation about a second axis, a ring mounted for limited rotation in said casing about the axis of said gimbal, a concentric ring slidably but non-rotatably mounted within said first ring and having inter-engaging means between said rings to lift the same on rotation of said outer ring, a setting knob for rotating said outer ring and thereby lifting the inner ring with respect thereto, and means slidably mounted in said gimbal and adapted to be engaged by said inner ring when lifted for locking said frame against oscillation about said second axis and for frictionally opposing turning of said gimbal about said first axis.

10. Locking means for gyroscopes comprising the combination with an outer casing of, a rotor bearing frame, a gimbal ring journaled in said casing for turning about an axis and within which said frame is journaled for movement about a second axis, a ring mounted for limited rotation in said casing about the axis of said gimbal, a concentric ring slidably but non-rotatably mounted for movement relative to said first ring, inter-engaging means between said rings to lift the slidable ring on rotation of said first ring, a setting knob for rotating said first ring and thereby lift the slidable ring with respect thereto, and means slidably mounted in said gimbal and adapted to be engaged by said slidable ring when lifted for locking said frame against movement about said second axis and for frictionally opposing turning of said gimbal about said first axis.

LENNOX F. BEACH.
ORLAND E. ESVAL.
ARTHUR W. LANE.